(12) United States Patent
Imakita et al.

(10) Patent No.: US 11,312,656 B2
(45) Date of Patent: Apr. 26, 2022

(54) CHEMICALLY STRENGTHENED GLASS

(71) Applicant: AGC Inc., Chiyoda-ku (JP)

(72) Inventors: Kenji Imakita, Tokyo (JP); Suguru Murayama, Tokyo (JP); Izuru Kashima, Tokyo (JP); Kazuki Kanehara, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 40 days.

(21) Appl. No.: 16/585,200

(22) Filed: Sep. 27, 2019

(65) Prior Publication Data
US 2020/0039876 A1 Feb. 6, 2020

Related U.S. Application Data

(63) Continuation of application No. PCT/JP2018/014277, filed on Apr. 3, 2018.

(30) Foreign Application Priority Data

Apr. 6, 2017 (JP) .............................. JP2017-076106
Feb. 5, 2018 (JP) .............................. JP2018-018508

(51) Int. Cl.
*C03C 21/00* (2006.01)
*C03C 3/083* (2006.01)
(Continued)

(52) U.S. Cl.
CPC ............ *C03C 21/002* (2013.01); *C03C 3/083* (2013.01); *C03C 3/085* (2013.01); *C03C 3/091* (2013.01); *C03C 3/093* (2013.01); *C03C 3/097* (2013.01)

(58) Field of Classification Search
None
See application file for complete search history.

(56) References Cited

U.S. PATENT DOCUMENTS

| 6,387,510 B1 | 5/2002 | Nakashima et al. |
| 2005/0244656 A1 | 11/2005 | Ikenishi et al. |

(Continued)

FOREIGN PATENT DOCUMENTS

| JP | 2000-357318 A | 12/2000 |
| JP | 2005-314159 A | 11/2005 |

(Continued)

OTHER PUBLICATIONS

Essential Laboratory Mathematics, Johnson et al., p. 30 (Year: 2003).*

(Continued)

*Primary Examiner* — David Sample
(74) *Attorney, Agent, or Firm* — Oblon, McClelland, Maier & Neustadt, L.L.P.

(57) ABSTRACT

The present invention relates to a chemically strengthened glass satisfying $A_1$ [MPa] of 600 or more, $A_2$ [MPa] of 50 or more, $B_1$ [μm] of 6 or less, $B_2$ [μm] of 10% or more of t [μm], C [MPa] of −30 or less, and $A_1/B_1$ [MPa/μm] of 100 or more when the chemically strengthened glass has a thickness t [μm] and a profile of a stress value [MPa] at a depth x [μm] from a glass surface is approximated by an error least-squares method in a region of $0<x<3t/8$ using the following function while defining a compressive stress as positive and a tensile stress as negative: $A_1 \text{erfc}(x/B_1)+A_2\text{erfc}(x/B_2)+C$, in which erfc is a complementary error function, and relations of $A_1>A_2$ and $B_1<B_2$ are satisfied.

9 Claims, 4 Drawing Sheets

(51) Int. Cl.
  *C03C 3/085* (2006.01)
  *C03C 3/091* (2006.01)
  *C03C 3/093* (2006.01)
  *C03C 3/097* (2006.01)

(56) References Cited

U.S. PATENT DOCUMENTS

| | | |
|---|---|---|
| 2010/0119846 A1 | 5/2010 | Sawada |
| 2011/0312483 A1 | 12/2011 | Nakashima et al. |
| 2012/0264585 A1 | 10/2012 | Ohara et al. |
| 2013/0189486 A1 | 7/2013 | Wang et al. |
| 2013/0199241 A1 | 8/2013 | Sawada |
| 2014/0227525 A1 | 8/2014 | Matsuda et al. |
| 2014/0234607 A1 | 8/2014 | Matsuda et al. |
| 2014/0248495 A1 | 9/2014 | Matsuda et al. |
| 2014/0364298 A1 | 12/2014 | Ohara et al. |
| 2015/0030834 A1* | 1/2015 | Morey ............... G01N 3/30 428/220 |
| 2015/0239775 A1* | 8/2015 | Amin ............... C03C 3/091 428/220 |
| 2015/0239777 A1* | 8/2015 | Mauro ............... C03C 21/005 428/410 |
| 2015/0259244 A1 | 9/2015 | Amin et al. |
| 2015/0368153 A1* | 12/2015 | Pesansky ............... C03C 3/097 428/220 |
| 2016/0122239 A1* | 5/2016 | Amin ............... C03C 3/097 428/220 |
| 2017/0197384 A1* | 7/2017 | Finkeldey ............... B32B 17/10036 |
| 2017/0197876 A1* | 7/2017 | Oram ............... C03C 3/097 |
| 2017/0295657 A1* | 10/2017 | Gross ............... H05K 5/0217 |
| 2018/0105461 A1* | 4/2018 | Schneider ............... C03C 17/30 |

FOREIGN PATENT DOCUMENTS

| | | |
|---|---|---|
| JP | 2008-247732 A | 10/2008 |
| JP | 2012-20921 A | 2/2012 |
| JP | 2012-232882 A | 11/2012 |
| JP | 2013-520385 A | 6/2013 |
| WO | WO 2013/047679 A1 | 4/2013 |

OTHER PUBLICATIONS

International Search Report dated May 22, 2018 in PCT/JP2018/014277 filed on Apr. 3, 2018 (with English Translation).
Written Opinion dated May 22, 2018 in PCT/JP2018/014277 filed on Apr. 3, 2018.

* cited by examiner

CHEMICALLY STRENGTHENED GLASS

TECHNICAL FIELD

The present invention relates to a chemically strengthened glass.

BACKGROUND ART

In recent years, a cover glass including a chemically strengthened glass has been used for enhancing protection and beauty of a display device of a mobile device such as a mobile phone, a smart phone, a personal digital assistant (PDA), and a tablet terminal. The chemically strengthened glass is a glass in which a surface layer is formed on a glass surface by means of ion exchange for the purpose of increasing a strength of the glass. The surface layer includes at least a compressive stress layer which exists on the glass surface side and in which a compressive stress is generated owing to ion exchange, and a tensile stress layer which exists adjacent to the compressive stress layer on the glass internal side and in which a tensile stress is generated. The strength of the chemically strengthened glass strongly depends on a compressive stress value (hereinafter referred to as "stress profile") in which a depth from the glass surface is a variable.

The chemically strengthened glass for a cover glass is required such that it is not cracked when dropping on the plane of sand, asphalt, or the like. When the chemically strengthened glass drops on the sand or asphalt and is cracked, protruding objects existing on the sand or asphalt stick into the glass, and a position deeper than the glass surface becomes a starting point of cracking. Therefore, there is a tendency that as a depth of the compressive stress layer (DOL) is large, the chemically strengthened glass is hardly cracked.

In addition, the chemically strengthened glass for a cover glass is required such that it is not cracked when deflected by an external force. When the chemically strengthened glass is cracked due to deflection, the starting point of cracking is the surface of the glass, and therefore, there is a tendency that as the compressive stress (value) (CS) on the glass surface is high, the chemically strengthened glass is hardly cracked.

For example, PTL 1 describes a glass article utilizing a two-stage chemical strengthening treatment. PTL 1 proposes a method in which by using a KNO$_3$/NaNO$_3$ mixed salt having a relatively low K concentration for the first-stage chemical strengthening, and by using a KNO$_3$/NaNO$_3$ mixed salt having a relatively high K concentration for the second-stage chemical strengthening, both large DOL and high CS are made compatible with each other.

CITATION LIST

Patent Literature

PTL 1: US 2015/0239775 A

SUMMARY OF INVENTION

Technical Problem

However, in the glass article described in PTL 1, the strength of the chemically strengthened glass may be insufficient. It can be considered that this is caused due to insufficiency of the surface compressive stress and the depth of the compressive stress layer. On the other hand, to maintain a balance with the compressive stress on the glass surface, an internal tensile stress (CT) is generated inside the chemically strengthened glass, and as CS or DOL is large, CT becomes large. When the chemically strengthened glass with large CT is cracked, the cracking manner is vigorous with a large number of fragments, and as a result, the risk that the fragments scatter increases. Accordingly, it is desired that the total amount of the compressive stresses is a certain value or less. In consequence, an object of the present invention is to provide a chemically strengthened glass having a high surface compressive stress and a large depth of a compressive stress layer as compared with those in the conventional art, while controlling the total amount of the compressive stress values to a certain value or less.

Solution to Problem

The present inventors have made extensive and intensive investigations. As a result, it has been found that in a chemically strengthened glass having a two-stage stress distribution pattern including a stress distribution pattern 1 (hereinafter also abbreviated as "pattern 1") appearing on the glass surface side and a stress distribution pattern 2 (hereinafter also abbreviated as "pattern 2") appearing on the glass internal side, by making a depth of a compressive stress layer of the pattern 1 small and making a compressive stress value of the pattern 2 small, a high surface compressive stress and a large depth of the compressive stress layer can be attained while controlling the total amount of the compressive stress values to a certain value or less, thereby leading to accomplishment of the present invention.

Specifically, the present invention relates to the following <1> to <7>.

<1> A chemically strengthened glass satisfying $A_1$ [MPa] of 600 or more, $A_2$ [MPa] of 50 or more, $B_1$ [μm] of 6 or less, $B_2$ [μm] of 10% or more of t [μm], C [MPa] of −30 or less, and $A_1/B_1$ [MPa/μm] of 100 or more when the chemically strengthened glass has a thickness t [μm] and a profile of a stress value [MPa] at a depth x [μm] from a glass surface is approximated by an error least-squares method in a region of 0<x<3t/8 using the following function (I) while defining a compressive stress as positive and a tensile stress as negative:

$$A_1 \mathrm{erfc}(x/B_1) + A_2 \mathrm{erfc}(x/B_2) + C \quad (I),$$

in which erfc is a complementary error function, and relations of $A_1 > A_2$ and $B_1 < B_2$ are satisfied.

<2> The chemically strengthened glass as set forth in <1>, wherein $B_2$ [μm] is 20% or more of t [μm].

<3> The chemically strengthened glass as set forth in <1> or <2>, wherein $A_2$ [MPa] is 150 or more, and $A_2/B_2$ [MPa/μm] is 4 or less.

<4> The chemically strengthened glass as set forth in any one of <1> to <3>, wherein C [MPa] is −70 or less.

<5> The chemically strengthened glass as set forth in any one of <1> to <4>, wherein the thickness t is 0.3 mm or more and 2 mm or less.

<6> The chemically strengthened glass as set forth in any one of <1> to <5>, having a base composition including 50 to 80% of SiO$_2$, 4 to 30% of Al$_2$O$_3$, 0 to 15% of B$_2$O$_3$, 0 to 15% of P$_2$O$_5$, 0 to 20% of MgO, 0 to 20% of CaO, 0 to 10% of SrO, 0 to 10% of BaO, 0 to 10% of ZnO, 0 to 20% of TiO$_2$, 0 to 10% of ZrO$_2$, 3 to 20% of Li$_2$O, 0 to 20% of Na$_2$O, and 0 to 20% of K$_2$O in mole percentage on an oxide basis.

<7> The chemically strengthened glass as set forth in any one of <1> to <5>, having a base composition including 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, 0 to 20% of $K_2O$, and 0.1 to 5% of $Y_2O_3$ in mole percentage on an oxide basis.

<8> The chemically strengthened glass as set forth in any one of <1> to <7>, which is a glass substrate for a cover glass.

Advantageous Effects of Invention

The chemically strengthened glass of the present invention has a high surface compressive stress and a large depth of a compressive stress layer as compared with those in the conventional art, and also has the total amount of the compressive stresses of a certain value or less and a high strength.

DESCRIPTION OF EMBODIMENTS

The chemically strengthened glass of the present invention is hereunder described in detail. In addition, in this description, the numerical range expressed using "to" indicates a range including the numerical values before and after "to" as the minimum value and the maximum value, respectively. In this specification, the terms "to" are hereunder used as the same meanings unless otherwise indicated.

The chemically strengthened glass of the present invention is a chemically strengthened glass satisfying all of the items (1) to (6) shown below when the chemically strengthened glass has a thickness t [μm] and a profile of a stress value [MPa] at a depth x [μm] from a glass surface is approximated by an error least-squares method especially in a region of 0<x<3t/8 using the following function (I) while defining a compressive stress as positive and a tensile stress as negative.

$$A_1 \mathrm{erfc}(x/B_1) + A_2 \mathrm{erfc}(x/B_2) + C \qquad (I)$$

In the function (I), erfc is a complementary error function, and relations of $A_1 > A_2$, and $B_1 < B_2$ are satisfied.

(1) $A_1$ [MPa] is 600 or more;
(2) $A_2$ [MPa] is 50 or more;
(3) $B_1$ [μm] is 6 or less;
(4) $B_2$ [μm] is 10% or more of t [μm];
(5) C [MPa] is −30 or less; and
(6) $A_1/B_1$ [MPa/μm] is 100 or more.

The chemically strengthened glass of the present invention includes a compressive stress layer formed by a chemical strengthening treatment on the surface thereof. In the chemical strengthening treatment, the surface of the glass is ion-exchanged to form a surface layer having a compressive stress remaining therein. Specifically, an alkali metal ion (typically, a Li ion or a Na ion) having a small ionic radius existing in the vicinity of the glass sheet surface is substituted with an alkali ion (typically, a Na ion or a K ion for the Li ion, and a K ion for the Na ion) having a larger ionic radius by ion exchange at a temperature equal to or lower than a glass transition point. According to this, a compressive stress remains on the surface of the glass, and a strength of the glass is improved.

Figure 1:
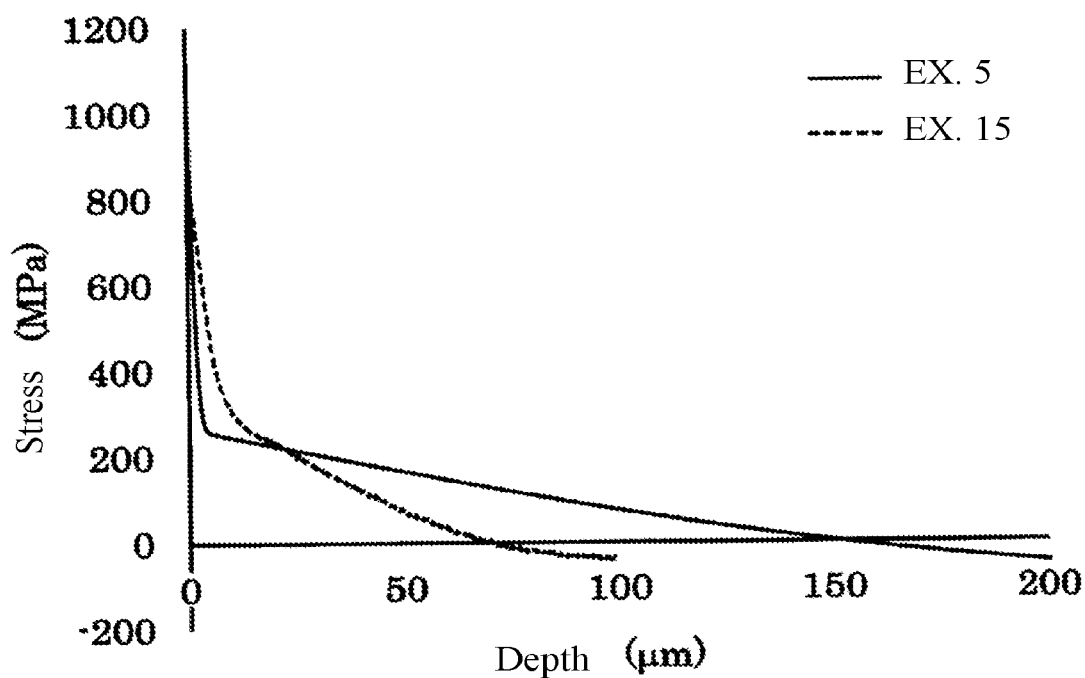
FIG. 1 illustrates an example of a stress distribution pattern of a chemically strengthened glass of each of a working example and a comparative example. A solid line of FIG. 1 is a stress profile of a chemically strengthened glass described in Example 5 in Table 1, and a dotted line is a stress profile of a chemically strengthened glass described in Example 15 in Table 1.

The chemically strengthened glass obtained through a two-stage chemical strengthening treatment (hereinafter also referred to as "two-stage strengthening") in which after a first-stage chemical strengthening treatment, a second-stage chemical strengthening treatment is performed under a condition different from a first-stage condition (e.g., the kind of a salt, time, etc.) has a two-stage stress distribution pattern including a stress distribution pattern 1 on the glass surface side and a stress distribution pattern 2 on the glass internal side. An example of such a stress distribution pattern of the chemically strengthened glass is illustrated in FIG. 1.

With respect to a profile of a stress value [MPa] at a depth x [μm] from the glass surface, a stress distribution pattern 1 on the glass surface side and a stress distribution pattern 2 on the glass internal side can be approximated using the following function (a) and the following function (b), respectively, while defining a compressive stress as positive and a tensile stress as negative.

$$A_1 \mathrm{erfc}(x/B_1) + C_1 \qquad (a)$$

$$A_2 \mathrm{erfc}(x/B_2) + C_2 \qquad (b)$$

In the functions (a) and (b), erfc is a complementary error function, and relations of $A_1 > A_2$, and $B_1 < B_2$ are satisfied.

Figure 2:
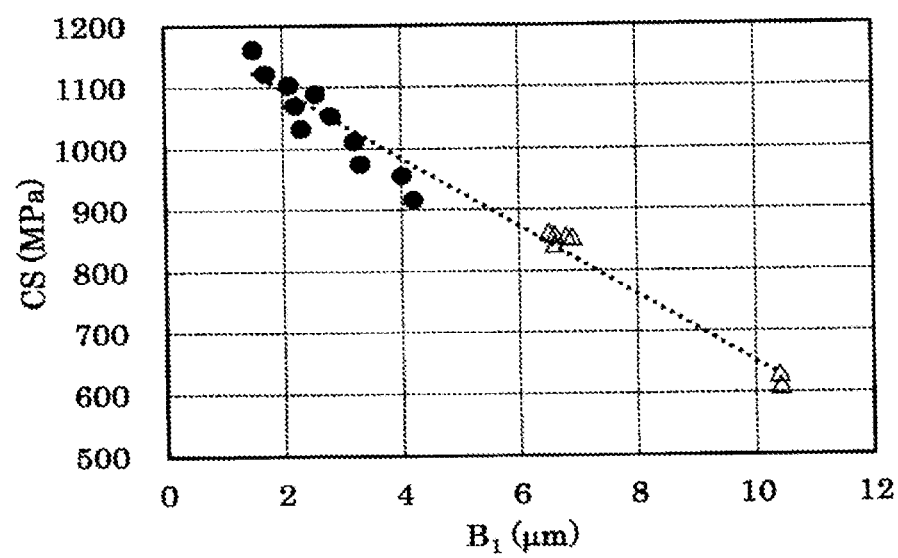
FIG. 2 is a graph illustrating a correlation between a depth ($B_1$) of a stress distribution pattern 1 on the glass surface side and a compressive stress (CS) of the outermost surface. $B_1$ and CS in FIG. 2 are plots of values described in Examples 1 to 19 in Table 1, in which plots of white triangles are concerned with comparative examples (Examples 13 to 19), and plots of black circles are concerned with working examples (Examples 1 to 12).

$A_1$ is a parameter expressing the degree of a compressive stress of the stress distribution pattern 1; $B_1$ is a parameter expressing the depth of a compressive stress layer of the stress distribution pattern 1; $A_2$ is a parameter expressing the degree of a compressive stress of the stress distribution pattern 2; and $B_2$ is a parameter expressing the depth of a compressive stress of the stress distribution pattern 2. The sum of $C_1$ and $C_2$ is corresponding to the degree of an internal tensile stress, and the sum of $A_1$, $A_2$, $C_1$, and $C_2$ is corresponding to a compressive stress (CS) of the outermost surface. The present inventors have advanced research regarding the chemically strengthened glass having such a two-stage stress distribution pattern and have found that there is a tendency that as the depth ($B_1$) of the compressive stress layer of the pattern 1 on the glass surface side is small, the compressive stress (CS) on the outermost surface becomes large, as illustrated in FIG. 2.

Furthermore, the present inventors have found that the chemically strengthened glass satisfying all of the conditions (1) to (6) shown below when the chemically strengthened glass has a thickness t [μm] and a profile of a stress value [MPa] at a depth x [μm] from the glass surface is approximated by an error least-squares method in a region of 0<x<3t/8 according to the foregoing function (I) using the foregoing functions (a) and (b) while defining a compressive stress as positive and a tensile stress as negative, has both a high surface compressive stress and a large depth of a compressive stress layer as compared with those in the conventional art, and makes it possible to control the total amount of the compressive stresses to a certain value or less and has a high strength.

(1) $A_1$ [MPa] is 600 or more;
(2) $A_2$ [MPa] is 50 or more;
(3) $B_1$ [μm] is 6 or less;
(4) $B_2$ [μm] is 10% or more of t [μm];
(5) C [MPa] is −30 or less; and
(6) $A_1/B_1$ [MPa/μm] is 100 or more.

With respect to the foregoing (1), $A_1$ [MPa] is 600 or more, preferably 700 or more, more preferably 750 or more, and still more preferably 800 or more. In the case where $A_1$ [MPa] is 600 or more, a high strength against deflection or bending is obtained. Although an upper limit of $A_1$ [MPa] is not particularly limited, in the case where the compressive stress is large, the internal tensile stress to be generated according thereto tends to become large, and in the case where the internal tensile stress becomes large, when a flaw generated on the glass surface reaches the inside, a risk for vigorous fracture becomes large. Then, in order to enhance safety at the time of fracture, $A_1$ [MPa] is preferably 1,000 or less, more preferably 950 or less, and still more preferably 920 or less.

With respect to the foregoing (2), $A_2$ [MPa/μm] is 50 or more, more preferably 100 or more, still more preferably 150 or more, and especially preferably 200 or more. In the case where $A_2$ [MPa/μm] is 50 or more, for example on the occasion of dropping on the sand, crack resistance with flawing due to an acute-angle object is improved. Although an upper limit of $A_2$ is not particularly limited, in order to enhance safety at the time of fracture, $A_2$ is preferably 600 or less, more preferably 500 or less, and still more preferably 400 or less.

With respect to the foregoing (3), $B_1$ [μm] is 6 or less, preferably 5.5 or less, more preferably 5.0 or less, and still more preferably 4.5 or less. In the case where $B_1$ [μm] is 6 or less, it becomes possible to improve CS while suppressing an integrated value of the compressive stress small. Although a lower limit of $B_1$ [μm] is not particularly limited, since it is preferred that $B_1$ is thoroughly larger than the depth of a flaw existing on the glass surface or the surface roughness, $B_1$ is preferably 0.5 or more, more preferably 0.75 or more, and still more preferably 1.0 or more.

With respect to the foregoing (4), $B_2$ [μm] is 10% or more, preferably 20% or more, more preferably 21% or more, still more preferably 22% or more, and especially preferably 23% or more of t [μm]. In the case where $B_2$ [μm] is 10% or more of t [μm], for example on the occasion of dropping on the sand, crack resistance with flawing due to an acute-angle object is improved. Although an upper limit of the ratio of $B_2$ [μm] to t [μm] is not particularly limited, in view of the fact that an integrated value of the compressive stress value must be controlled to a certain value or less, $B_2$ [μm] is preferably 40% or less, more preferably 35% or less, and still more preferably 33% or less.

With respect to the foregoing (5), C is −30 or less. C is a constant relative to the internal tensile stress of the glass, and in the case where C is larger than −30, it is difficult to make the compressive stress value of the glass surface layer sufficiently high. C is preferably −50 or less, more preferably −70 or less, and still more preferably −80 or less. In addition, C is preferably −150 or more, more preferably −140 or more, and still more preferably −130 or more. In the case where C is −150 or more, when the glass is fractured, the matter that the cracking manner is vigorous with a large number of fragments is prevented from occurring, and as a result, the risk that the fragments scatter can be reduced.

With respect to the foregoing (6), $A_1/B_1$ [MPa/μm] is 100 or more, preferably 150 or more, more preferably 180 or more, and still more preferably 220 or more. In the case where $A_1/B_1$ [MPa/μm] is 100 or more, CS can be increased while suppressing an integrated value of the compressive stress value low. Although an upper limit of $A_1/B_1$ [MPa/μm] is not particularly limited, when the respective preferred ranges of $A_1$ and $B_1$ are taken into consideration, $A_1/B_1$ [MPa/μm] is preferably 2,000 or less, more preferably 1,500 or less, and still more preferably 900 or less.

In the chemically strengthened glass of the present invention, $A_2$ [MPa/μm] is preferably 150 or more, more preferably 175 or more, still more preferably 200 or more, and especially preferably 250 or more, and $A_2/B_2$ [MPa/μm] is preferably 4 or less, more preferably 3.5 or less, still more preferably 3 or less, and especially preferably 2.5 or less. In the case where $A_2$ [MPa/μm] is 150 or more and $A_2/B_2$ [MPa/μm] is 4 or less, for example on the occasion of dropping on the sand, the crack resistance with flawing due to an acute-angle object is more improved. Although a lower limit of $A_2/B_2$ [MPa/μm] is not particularly limited, when the respective preferred ranges of $A_2$ and $B_2$ are taken into consideration, $A_2/B_2$ [MPa/μm] is preferably 0.9 or more, more preferably 1.0 or more, and still more preferably 1.1 or more.

$A_1$, $B_1$, $A_2$, and $B_2$ can be adjusted by adjusting the condition of the chemical strengthening treatment, the composition of the glass, and the like.

However, in the production of the chemically strengthened glass of the present invention, it is preferred to make the depth of a compressive stress layer for forming the stress distribution pattern 1 on the glass surface side small and to make the depth of a compressive stress layer for forming the stress distribution pattern 2 on the glass internal side large. Therefore, it is preferred to make an ion exchange rate for forming the pattern 1 low and to make an ion exchange rate for forming the pattern 2 high.

In the conventional chemically strengthened glasses, it is general that both of the pattern 1 and the pattern 2 are formed through ion exchange between a sodium ion in the glass and a potassium ion in a strengthening salt, and the ion exchange rate has been principally controlled by the chemical strengthening temperature.

But, according to a method of controlling the ion exchange rate by controlling the chemical strengthening temperature, there is a case where the chemical strengthening temperature can be controlled only in a certain temperature range due to restrictions in the melting point and the decomposition temperature of the strengthening salt. That is, when the chemical strengthening temperature is excessively low, the strengthening salt is hardly melted, so that the chemical strengthening becomes difficult, whereas when the chemical strengthening temperature is excessively high, the strengthening salt is thermally decomposed step-by-step, so that the production of a stable chemically strengthened glass may become difficult.

Then, the present inventors have found that in addition to control of the chemical strengthening temperature, by using a glass having a preferred specified glass composition, the preferred stress distribution pattern is easily obtained, and a high surface compressive stress and a large depth of a compressive stress layer can be attained while controlling the total amount of the compressive stress values to a certain value or less, an aspect of which is the problem of the present invention. A preferred glass composition is described later.

The surface compressive stress (value) (CS) [MPa] is a value measured with a surface stress meter (for example, a surface stress meter FSM-6000, manufactured by Orihara Industrial Co., Ltd.).

Preferably, the chemically strengthened glass of the present invention has a surface compressive stress value (CS) of 600 MPa or more. CS of the chemically strengthened glass of 600 MPa or more is preferred because the chemically strengthened glass has a favorable strength as a cover glass of a smart phone or a tablet PC. CS of the chemically strengthened glass is more preferably 700 MPa or more, still more preferably 800 MPa or more, especially preferably 850 MPa or more, and most preferably 900 MPa or more.

On the other hand, although an upper limit of CS of the chemically strengthened glass is not particularly limited, there is a tendency that when CS becomes large, the internal tensile stress becomes large, so that there is a concern that the glass is vigorously fractured. Therefore, from the viewpoint of safety at the time of fracture, CS is, for example, 2,000 MPa or less, preferably 1,700 MPa or less, more preferably 1,500 MPa or less, and still more preferably 1,300 MPa or less.

CS of the chemically strengthened glass can be appropriately adjusted by adjusting the condition of the chemical strengthening treatment, the composition of the glass, and the like.

In the chemically strengthened glass of the present invention, the depth of a compressive stress (DOL) is preferably 70 μm or more. In the case where DOL is 70 μm or more, for example on the occasion of dropping on the sand, crack resistance with flawing due to an acute-angle object is improved. In order to make the strength of the chemically strengthened glass high, DOL is preferably 60 μm or more, and more preferably stepwise, 90 or more, 100 μM or more, 110 μm or more, 120 μm or more, 130 μm or more, or 140 or more.

On the other hand, although an upper limit of DOL is not particularly limited, in order to suppress an integrated value of the compressive stress value small, DOL is, for example, 200 μm or less, preferably 180 μm or less, more preferably 170 μm or less, and especially preferably 160 μm or less.

DOL can be appropriately adjusted by adjusting the condition of the chemical strengthening treatment, the composition of the glass, and the like.

In this specification, DOL is a depth from the glass surface of a portion where the stress in the stress profile is zero. DOL can be estimated by thinning a cross section of the glass and analyzing the thinned sample using a birefringence imaging system. Examples of the birefringence imaging system include a birefringence imaging system Abrio-IM, manufactured by Tokyo Instruments, Inc. In addition, DOL can also be estimated by utilizing scattered-light photoelasticity. According to this method, DOL can be estimated by making a light incident from the surface of the glass and analyzing a polarized light of the scattered light.

As for the chemically strengthened glass of the present invention, in a fracture test according to an indenter indentation test under a condition of holding a load ranging from 5 kgf to 10 kgf for 15 seconds with a pyramidal diamond indenter having an indenter angle of the facing angle of 90°, the number of fragments generated within a size of 25 mm×25 mm is preferably 100 or less. In the case where the number of fragments (fragmentation number) in the fracture test by the indenter indentation test is 100 or less, even when the glass is fractured, high safety can be ensured. The fragmentation number is more preferably 50 or less, still more preferably 20 or less, and especially preferably 10 or less.

As for the chemically strengthened glass of the present invention, in a test of colliding a diamond indenter (indenter angle of the facing angle: 160°) on the glass surface by using a pendulum impact tester, a kinetic energy of the diamond indenter when a fragmentation probability of the glass is 50% (hereinafter referred to as "fracture energy") is preferably 80 mJ or more. In the pendulum impact test using a diamond indenter, in the case where the fracture energy is 80 mJ or more, when dropping on the plane having protruding objects, such as a sand or an asphalt, the glass is hardly cracked. The fracture energy is more preferably 100 mJ or more, and still more preferably 120 mJ or more.

As for the chemically strengthened glass of the present invention, a bending strength is preferably 500 MPa or more. In the case where the bending strength is 500 MPa or more, a sufficient strength against deflection that is assumed in daily life can be obtained. For example, it is known that when dropping on the plane having no protruding object, such as marble, the glass is cracked due to deflection. However, a glass having a bending strength of 500 MPa or more has a practically sufficient strength when dropping on the plane having no protruding object.

As for the chemically strengthened glass of the present invention, a bending strength after flawing as determined by the following method is preferably 150 MPa or more. The degree of the tensile stress generated on the cover glass surface at the time of dropping of a smart phone is about 150 MPa, and in the case where the above-described bending strength is 150 MPa or more, fracture due to the stress generated by dropping can be prevented from occurring even after a flaw is generated by an acute-angle object. The bending strength after flawing is preferably 200 MPa or more, more preferably 250 MPa or more, and still more preferably 300 MPa or more.

The bending strength after flawing means a fracture stress value σa (bending strength, unit: MPa) obtained by performing a four-point bending test under a condition of a lower spun of 30 mm, an upper spun of 10 mm, and a crosshead speed of 0.5 mm/min after the glass surface is flawed by pressing a diamond indenter (indenter angle of the facing angle: 110°) thereonto for 15 seconds at a load of 0.5 kgf.

Subsequently, the base composition of the chemically strengthened glass in the present invention is described. In this specification, the base composition of the chemically strengthened glass means the composition of the glass before chemical strengthening (hereinafter sometimes referred to as "base glass" or "glass for chemical strengthening"). Here, it can be considered that a portion having a tensile stress of the chemically strengthened glass (hereinafter also referred to as "tensile stress portion") is a portion which is not ion-exchanged. Then, the tensile stress portion of the chemically strengthened glass has the same composition as the base glass, and the composition of the tensile stress portion can be regarded as the base composition.

The base composition of the chemically strengthened glass is described below. The content of each component is expressed in mole percentage on an oxide basis unless otherwise stated.

The composition of the glass can be measured by a wet analysis method such as an ICP emission spectroscopy. In the case where the glass does not contain a lot of components which are readily volatile especially during the melting process of the glass, it is also possible to determine the composition of the glass by a calculation from the blending ratio of the glass raw materials.

As the composition for the glass for chemical strengthening of the present invention (base composition of the chemically strengthened glass of the present invention), for example, one including 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, and 0 to 20% of $K_2O$ is preferred.

Furthermore, for example, one including 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, 0 to 20% of $K_2O$, and 0.1 to 5% of $Y_2O_3$ in mole percentage on an oxide basis is preferred.

According to the glass having the aforementioned composition, by adopting ion exchange between Na and K which has a low ion exchange rate for forming the stress distribution pattern 1 on the glass surface side, and by adopting ion exchange between Na and Li which has a high ion exchange rate for forming the stress distribution pattern 2 on the glass internal side, it becomes easy to make the depth of the compressive stress layer of the pattern 1 small and to make the depth of the compressive stress layer of the pattern 2 large. The chemical strengthening treatment is mentioned later.

Specifically, for example, the following glasses are exemplified.

(a) A glass including 69 to 71% of $SiO_2$, 7 to 9% of $Al_2O_3$, 0 to 1% of $B_2O_3$, 0 to 1% of $P_2O_5$, 7.5 to 9% of $Li_2O$, 4 to 6% of $Na_2O$, 0 to 2% of $K_2O$, 6 to 8% of MgO, 0 to 1% of CaO, 0 to 1% of SrO, 0 to 1% of BaO, 0 to 1% of ZnO, 0 to 1% of $TiO_2$, and 0 to 2% of $ZrO_2$.

(b) A glass including 62 to 69% of $SiO_2$, 8 to 12% of $Al_2O_3$, 0 to 1% of $B_2O_3$, 0 to 1% of $P_2O_5$, 8 to 12% of $Li_2O$, 4 to 6% of $Na_2O$, 0 to 2% of $K_2O$, 3 to 8% of MgO, 0 to 1% of CaO, 0 to 1% of SrO, 0 to 1% of BaO, 0 to 1% of ZnO, 0 to 1% of $TiO_2$, 0 to 2% of $ZrO_2$, and 0.1 to 5% of $Y_2O_3$.

$SiO_2$ is a component that forms the network of the glass. In addition, $SiO_2$ is a component that enhances chemical durability and is a component that reduces the generation of a crack when the glass surface is flawed (indented). The content of $SiO_2$ is preferably 50% or more. The content of $SiO_2$ is more preferably stepwise, 56% or more, 62% or more, 65% or more, 67% or more, 68% or more, or 69% or more.

In order to prevent a decrease of meltability from occurring, the content of $SiO_2$ is preferably 80% or less, more preferably 75% or less, still more preferably 73% or less, especially preferably 72% or less, and most preferably 71% or less. However, in the case of containing 0.1% or more of $Y_2O_3$, the content of $SiO_2$ is preferably 74% or less, more preferably 69% or less, and still more preferably 67% or less.

$Al_2O_3$ is a component that reduces the number of fragments when the chemically strengthened glass is cracked. In the case where the number of fragments is small, the fragments are hardly scattered at the time of fracture. In addition, $Al_2O_3$ is a component that is effective for improving ion exchange performance at the time of chemical strengthening and increasing the surface compressive stress after strengthening, and is also a component that increases Tg of the glass and increases the Young's modulus.

The content of $Al_2O_3$ is preferably 4% or more, and more preferably stepwise, 4.5% or more, 5.0% or more, 5.5% or more, 6.0% or more, 6.5% or more, or 7.0% or more. However, in the case of containing 0.1% or more of $Y_2O_3$, the content of $Al_2O_3$ is preferably 8% or more, more preferably 8.5% or more, still more preferably 9.5% or more, and especially preferably 10% or more.

The content of $Al_2O_3$ is preferably 30% or less, more preferably 15% or less, still more preferably 12% or less, especially preferably 10% or less, and most preferably 9% or less. In the case of containing 0.1% or more of $Y_2O_3$, the content of $Al_2O_3$ is preferably 20% or less, more preferably 18% or less, still more preferably 16% or less, especially preferably 14% or less, and yet still more preferably 12% or less. In the case where the content of $Al_2O_3$ is 30% or less, a decrease of acid resistance of the glass is suppressed, an increase of devitrification temperature is prevented from occurring, and an increase of viscosity of the glass is suppressed, thereby enabling the meltability to be improved.

$B_2O_3$ is a component that improves chipping resistance of the glass for chemical strengthening or chemically strengthened glass and improves the meltability. Although $B_2O_3$ is not essential, in order to improve the meltability, the content in the case of containing $B_2O_3$ is preferably 0.5% or more, more preferably 1% or more, and still more preferably 2% or more.

The content of $B_2O_3$ is preferably 15% or less, more preferably 10% or less, still more preferably 5% or less, especially preferably 3% or less, and most preferably 1% or less. In the case where the content of $B_2O_3$ is 15% or less, the matter that striae is generated at the time of melting to decrease the quality of the glass for chemical strengthening can be prevented from occurring. In addition, in order to enhance the acid resistance, $B_2O_3$ is preferably not contained.

$P_2O_5$ is a component that improves ion exchange performance and chipping resistance. Although $P_2O_5$ may not be contained, the content in the case of containing $P_2O_5$ is preferably 0.5% or more, more preferably 1% or more, and still more preferably 2% or more.

The content of $P_2O_5$ is preferably 15% or less, more preferably 10% or less, still more preferably 5% or less, especially preferably 3% or less, and most preferably 1% or less. In the case where the content of $P_2O_5$ is 15% or less, the number of fragments when the chemically strengthened glass is fractured can be reduced, and a decrease of acid resistance can be suppressed. In order to enhance the acid resistance, $P_2O_5$ is preferably not contained.

MgO is a component that increases the surface compressive stress of the chemically strengthened glass and is a component that reduces the number of fragments when the chemically strengthened glass is fractured, and MgO may be contained. The content in the case of containing MgO is preferably 2% or more, and more preferably stepwise, 3% or more, 4% or more, 5% or more, or 6% or more.

The content of MgO is preferably 20% or less, and more preferably stepwise, 18% or less, 15% or less, 13% or less, 12% or less, 10% or less, 11% or less, or 8% or less. In the case where the content of MgO is 20% or less, devitrification when the glass for chemical strengthening is melted can be prevented from occurring.

CaO is a component that improves meltability of the glass for chemical strengthening and is a component that reduces the number of fragments when the chemically strengthened glass is fractured, and CaO may be contained. The content in the case of containing CaO is preferably 0.5% or more, more preferably 1% or more, still more preferably 2% or more and especially preferably 3% or more.

The content of CaO is preferably 20% or less, more preferably 14% or less, and still more preferably stepwise, 10% or less, 8% or less, 3% or less, or 1% or less. In the case where the content of CaO is 20% or less, a remarkable decrease of ion exchange performance can be prevented from occurring.

SrO is a component that improves meltability of the glass for chemical strengthening and is a component that reduces the number of fragments when the chemically strengthened glass is fractured, and SrO may be contained. The content in the case of containing SrO is preferably 0.1% or more, more preferably 0.5% or more, and still more preferably 1.0% or more.

The content of SrO is preferably 10% or less, more preferably 5% or less, still more preferably 3% or less, especially preferably 2% or less, and most preferably 1% or less. In the case where the content of SrO is 10% or less, a remarkable decrease of ion exchange performance can be prevented from occurring.

BaO is a component that improves meltability of the glass for chemical strengthening and is a component that reduces the number of fragments when the chemically strengthened glass is fractured, and BaO may be contained. The content in the case of containing BaO is preferably 0.5% or more, more preferably 1% or more, and still more preferably 1.5% or more.

The content of BaO is preferably 10% or less, more preferably 5% or less, still more preferably 3% or less, especially preferably 2% or less, and most preferably 1% or less. In the case where the content of BaO is 10% or less, a remarkable decrease of ion exchange performance can be prevented from occurring.

ZnO is a component that improves meltability of the glass, and ZnO may be contained. The content in the case of containing ZnO is preferably 0.25% or more, and more preferably 0.5% or more.

The content of ZnO is preferably 10% or less, more preferably 5% or less, still more preferably 3% or less, especially preferably 2% or less, and most preferably 1% or less. In the case where the content of ZnO is 10% or less, a remarkable decrease of weathering resistance of the glass can be prevented from occurring.

$TiO_2$ is a component that reduces the number of fragments when the chemically strengthened glass is fractured, and $TiO_2$ may be contained. The content in the case of containing $TiO_2$ is preferably 0.1% or more, and more preferably 0.15% or more.

The content of $TiO_2$ is preferably 10% or less, more preferably 5% or less, still more preferably 4% or less, yet still more preferably 3% or less, especially preferably 2% or less, and most preferably 0.25% or less. In the case where the content of $TiO_2$ is 10% or less, devitrification at the time of melting is hardly generated, and a decrease of the quality of the chemically strengthened glass can be prevented from occurring.

$ZrO_2$ is a component that increases the surface compressive stress which is generated owing to ion exchange and has an effect for reducing the number of fragments when the glass for chemical strengthening is fractured, and $ZrO_2$ may be contained. The content in the case of containing $ZrO_2$ is preferably 0.5% or more, and more preferably 1% or more.

The content of $ZrO_2$ is preferably 10% or less, more preferably 8% or less, still more preferably 5% or less, especially preferably 3% or less, and most preferably 2% or less. In the case where the content of $ZrO_2$ is 10% or less, devitrification at the time of melting is hardly generated, and a decrease of the quality of the chemically strengthened glass can be prevented from occurring.

$Li_2O$ is a component that forms a surface compressive stress owing to ion exchange and is a component that reduces the number of fragments when the chemically strengthened glass is fractured. The content of $Li_2O$ is preferably 3% or more, more preferably 5% or more, still more preferably 6% or more, especially preferably 7% or more, and typically 7.5% or more. In the case of containing 0.1% or more of $Y_2O_3$, the content of $Li_2O$ is 1% or more, preferably 3% or more, more preferably 5% or more, still more preferably 7% or more, especially preferably 9% or more, and most preferably 9.5% or more. In the case where the content of $Li_2O$ is 3% or more, it becomes possible to attain large DOL.

In order to suppress a devitrification growth rate at the time of melting of the glass, the content of $Li_2O$ is preferably 20% or less, more preferably 15% or less, still more preferably 12% or less, especially preferably 11% or less, and most preferably 9% or less. In the case of containing 0.1% or more of $Y_2O_3$, the content of $Li_2O$ is more preferably 17% or less, still more preferably 15% or less, especially preferably 12% or less, and most preferably 11% or less. In the case where the content of $Li_2O$ is 20% or less, a remarkable decrease of acid resistance of the glass can be prevented from occurring.

$Na_2O$ is a component that forms a surface compressive stress layer owing to ion exchange and improves meltability of the glass. The content in the case of containing $Na_2O$ is preferably 1% or more. The content of $Na_2O$ is more preferably 2% or more, still more preferably 3% or more, and especially preferably 4% or more.

The content of $Na_2O$ is preferably 20% or less, more preferably 9% or less, still more preferably 8% or less, especially preferably 7% or less, and most preferably 6% or less. In the case where the content of $Na_2O$ is 20% or less, a remarkable decrease of acid resistance of the glass can be prevented from occurring.

$K_2O$ may be contained for the purpose of improving ion exchange performance, or the like. The content in the case of containing $K_2O$ is preferably 0.5% or more, more preferably 1% or more, still more preferably 2% or more, and especially preferably 2.5% or more.

The content of $K_2O$ is preferably 20% or less, more preferably 10% or less, still more preferably 5% or less, especially preferably 3% or less, and most preferably 2% or less. In the case where the content of $K_2O$ is 20% or less, an increase of the number of fragments when the chemically strengthened glass is fractured can be prevented from occurring.

$Y_2O_3$, $La_2O_3$, and $Nb_2O_5$ are each a component that reduces the number of fragments when the chemically strengthened glass is fractured and may be contained. The each content in the case of containing each of these components is preferably 0.5% or more, more preferably 1% or more, still more preferably 1.5% or more, especially preferably 2% or more, and most preferably 2.5% or more.

In order to suppress devitrification on the occasion of forming the glass into a desired shape, 0.1% or more of $Y_2O_3$ is preferably contained. The content of $Y_2O_3$ is more preferably 0.2% or more, still more preferably 0.5% or more, especially preferably 0.8% or more, and typically 1% or more.

The content of each of $Y_2O_3$, $La_2O_3$, and $Nb_2O_5$ is preferably 6% or less because the glass is hardly devitrified at the time of melting. The content of each of $Y_2O_3$, $La_2O_3$, and $Nb_2O_5$ is more preferably 5% or less, still more preferably 4% or less, especially preferably 3% or less, and most preferably 2% or less.

$Ta_2O_5$ and $Gd_2O_3$ may be each contained in a small amount in order to reduce the number of fragments when the chemically strengthened glass is fractured. However, since the refractive index or the reactance increases, the content thereof is preferably 1% or less, and more preferably 0.5% or less, and still more preferably, they are not contained.

Furthermore, for the use of the colored glass, a coloring component may be added within a range where the achievement of desired chemical strengthening properties is not inhibited. Suitable examples of the coloring component include $Co_3O_4$, $MnO_2$, $Fe_2O_3$, $NiO$, $CuO$, $Cr_2O_3$, $V_2O_5$, $Bi_2O_3$, $SeO_2$, $TiO_2$, $CeO_2$, $Er_2O_3$, and $Nd_2O_3$.

The content of the coloring component is preferably in a range of 7% or less in total in mole percentage on an oxide basis. In the case where the content of the coloring component is 7% or less, the matter that the glass is readily devitrified can be prevented from occurring. The content of the coloring component is more preferably 5% or less, still more preferably 3% or less, and especially preferably 1% or less. In the case where the visible ray transmittance of the glass takes preference, it is preferred that these components are substantially not contained.

In this specification, the wording "substantially not contained" means that such components are not contained except unavoidable impurities contained in raw materials and the like, i.e., they are not intentionally contained. Specifically, it is indicated that the content in the glass composition is less than 0.1% by mol.

As a refining agent on the occasion of melting of the glass, $SO_3$, a chloride, a fluoride, or the like may be appropriately contained. Preferably, $As_2O_3$ is not contained. In the case of containing $Sb_2O_3$, the content thereof is preferably 0.3% or less, and more preferably 0.1% or less, and most preferably, it is not contained.

The chemically strengthened glass of the present invention preferably has at least one selected from the group consisting of a sodium ion, a silver ion, a potassium ion, a cesium ion, and a rubidium ion on the surface thereof. According to this, the compressive stress is induced into the surface, whereby the glass is highly strengthened. In addition, in the case where the silver ion is present on the surface, antibacterial properties can be imparted.

In the present invention, it is preferred to select a base composition of the chemically strengthened glass such that DOL is 50 μm or more in the case where an ion exchange treatment is performed for 1 hour with a molten salt at 400° C. including $KNO_3$, $NaNO_3$, or a mixed salt of $KNO_3$ and $NaNO_3$ on a glass sheet having a thickness of 1 mm which has the base composition of the chemically strengthened glass and has been annealed under the following condition. Here, the annealing is performed from a temperature T° C., which is 30° C. to 50° C. higher than the glass transition temperature, to (T−300)° C. at a cooling rate of 0.5° C./min.

Furthermore, in the present invention, it is preferred to select a base composition of the chemically strengthened glass such that DOL is 70 μm or more in the case where an ion exchange treatment is performed for 1 hour with a molten salt at 425° C. including $KNO_3$, $NaNO_3$, or a mixed salt of $KNO_3$ and $NaNO_3$ on a glass sheet having a thickness of 1 mm which has the base composition of the chemically strengthened glass and has been annealed under the following condition. Here, the annealing is performed from a temperature T° C., which is 30° C. to 50° C. higher than the glass transition temperature, to (T−300)° C. at a cooling rate of 0.5° C./min.

In the case of such a base composition, the ion exchange rate is high, and chemical strengthening can be performed for a short period of time.

From the viewpoint of making it possible to remarkably improve the strength by chemical strengthening, the thickness (t) of the chemically strengthened glass of the present invention is preferably 2 mm or less, more preferably stepwise, 1.5 mm or less, 1 mm or less, 0.9 mm or less, 0.8 mm or less, or 0.7 mm or less. In addition, from the viewpoint of obtaining an effect of sufficient improvement of the strength by the chemical strengthening treatment, the foregoing thickness (t) is preferably 0.3 mm or more, more preferably 0.5 mm or more, and still more preferably 0.6 mm or more.

The chemically strengthened glass of the present invention may have a shape other than the sheet form, for example, a fringed shape having a different thickness at outer periphery, depending upon the products, uses, and the like to which the glass is applied. In addition, the aforementioned glass sheet has two main surfaces and end surfaces that neighbors them to form the sheet thickness, and the two main surfaces may form flat faces that are parallel to each other. However, the configuration of the glass sheet is not limited thereto, and for example, the two main surfaces may not be parallel to each other, or all or a part of one or both of the two main surfaces may be curved. More specifically, the glass sheet may be, for example, a glass sheet having a warpage-free flat shape or may be a curved glass sheet having a curved surface.

The chemically strengthened glass of the present invention can be, for example, produced in the following manner. The following production method is an example in the case of producing a sheet-form chemically strengthened glass.

First of all, a glass to be subjected to a chemical strengthening treatment as mentioned later (glass for chemical strengthening) is prepared. For example, raw materials of respective components of the glass are blended and heated to melt in a glass melting furnace. Thereafter, the glass is homogenized by bubbling, stirring, addition of a refining agent, and the like, and then formed into a glass sheet with a predetermined thickness according to a conventionally known method, followed by annealing.

Examples of the forming method of a glass includes a float method, a press method, a fusion method, and a down-draw method. In particular, a float method suitable for mass production is preferred. In addition, other continuous forming methods than the float method, namely, a fusion method and a down-draw method are also preferred.

Thereafter, the formed glass is subjected to grinding and polishing treatments, as the need arises, thereby forming a glass substrate. In the case where the glass substrate is cut into a predetermined shape and size or chamfering of the glass substrate is performed, it is preferable to perform the cutting or chamfering of the glass substrate before the chemical strengthening treatment mentioned below, since a compressive stress layer is also formed on the end surface by the subsequent chemical strengthening treatment.

Then, after the formed glass substrate is subjected to the chemical strengthening treatment, the chemically strengthened glass of the present invention can be produced by washing and drying.

In the chemical strengthening treatment, by bringing the glass into contact with a molten liquid of a metal salt (for example, potassium nitrate) containing a metal ion having a large ionic radius (typically, a Na ion or a K ion) through immersion or the like, a metal ion having a small ionic radius (typically, a Na ion or a Li ion) in the glass is substituted with the metal ion having a large ionic radius.

In particular, in order to perform the chemical strengthening treatment at a high ion exchange rate, it is preferred to substitute the Li ion in the glass with the Na ion (Li—Na substitution).

Examples of the molten salt for performing the chemical strengthening treatment include a nitrate, a sulfate, a carbonate, and a chloride. Of these, examples of the nitrate include lithium nitrate, sodium nitrate, potassium nitrate, cesium nitrate, and silver nitrate. Examples of the sulfate include lithium sulfate, sodium sulfate, potassium sulfate, cesium sulfate, and silver sulfate. Examples of the carbonate include lithium carbonate, sodium carbonate, and potassium carbonate. Examples of the chloride include lithium chloride, sodium chloride, potassium chloride, cesium chloride, and silver chloride. These molten salts may be used alone or may be used in combination of plural kinds thereof.

Specifically, for example, in order to form the stress distribution pattern 1 on the glass surface side, it is preferred to use a $KNO_3$ salt as the molten salt, and in order to form the stress distribution pattern 2 on the glass internal side, it is preferred to use a $NaNO_3$ salt as the molten salt. In addition, in the production of a conventional chemically strengthened glass, a mixed salt of $NaNO_3$ and $KNO_3$ was frequently used. However, for chemical strengthening of a glass containing Li, it is more preferred to use them without being mixed.

The chemical strengthening treatment (ion exchange treatment) can be, for example, performed by immersing the glass in a molten salt heated to 360 to 600° C. for 0.1 to 500 hours. The heating temperature of the molten salt is preferably 350 to 500° C., and the immersing time of the glass in the molten salt is preferably 0.3 to 200 hours.

The chemically strengthened glass of the present invention can be obtained by performing a two-stage chemical strengthening treatment under a different condition from each other. For example, a chemical strengthening treatment is performed under a condition under which CS becomes relatively low as the first-stage chemical strengthening treatment, and then, a chemical strengthening treatment is performed under a condition under which CS becomes relatively high as the second-stage chemical strengthening treatment. Thus, an integrated value (total amount of the compressive stress values) of compressive stress generated in the compressive stress layer can be suppressed low while increasing CS on the outermost surface of the chemically strengthened glass, and as a result, an internal tensile stress (CT) can be suppressed low.

In order to realize a high surface compressive stress and a large depth of a compressive layer, specifically, for example, it is preferred that after the stress distribution pattern 2 on the glass internal side is formed by the first-stage chemical strengthening, the stress distribution pattern 1 on the glass surface side is formed by the second-stage chemical strengthening treatment. In the case where the pattern 1 is formed by the first-stage chemical strengthening treatment, on the occasion of forming the pattern 2 by the second-stage chemical strengthening treatment, there is a case where the form of the pattern 1 formed at the first stage is collapsed, whereby the depth of the compressive stress layer of the pattern 1 becomes large.

Specifically, examples of the condition for obtaining the chemically strengthened glass of the present invention include the following condition of the two-stage chemical strengthening treatment.

First-stage chemical strengthening treatment: A glass preferably having a base composition containing 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, and 0 to 20% of $K_2O$ is ion-exchanged with a molten salt preferably containing sodium nitrate at preferably 425 to 475° C. for preferably 2 to 5 hours.

Second-stage chemical strengthening treatment: The glass after the first-stage chemical strengthening treatment is ion-exchanged with a molten salt preferably containing potassium nitrate at preferably 375 to 450° C. for preferably 0.5 to 2 hours.

In the present invention, the treatment condition of the chemical strengthening treatment is not particularly limited to the aforementioned condition, and the appropriate condition of time, temperature, and the like may be selected taking into consideration the properties and composition of the glass, the kind of the molten salt, and the like.

The chemically strengthened glass of the present invention is particularly useful as a cover glass to be used in mobile devices such as a mobile phone, a smart phone, a personal digital assistant (PDA), and a tablet terminal. Furthermore, it is also useful, not for purpose of carrying, as a cover glass for display devices such as a television (TV), a personal computer (PC), and a touch panel; walls of elevator; walls (whole face display) of an architecture such as a house and a building; a building material such as an window pane; a table top; an interior of an automobile, an aircraft, and the like; and a cover glass thereof. In addition, it is useful in uses as non-tabular housings or the like having a curved shape by bending or molding.

EXAMPLES

The present invention is hereunder described by reference to Examples, but it should be construed that the present invention is not limited by these Examples.

Glasses of Examples 1 to 24 shown in Table 1 were prepared and evaluated in the following manners. Examples 1 to 12 and Examples 20 to 24 are concerned with working examples, and Examples 13 to 19 are concerned with comparative examples.

Examples 1 to 14 and 20 to 24

(Preparation of Chemically Strengthened Glass)

Glass sheets of Glasses 1 to 5 each having a composition shown in Table 1 in mole percentage on an oxide basis were prepared by platinum crucible melting. Glass raw materials that are generally used, such as an oxide, a hydroxide, a carbonate, and a nitrate, were appropriately selected and weighed so as to be 1,000 g as the resulting glass. Subsequently, the mixed raw material was put in a platinum crucible, then put into an electric resistance furnace at 1,500 to 1,700° C., and melted for about 3 hours to undergo defoamation and homogenization.

TABLE 1

|  | Glass 1 | Glass 2 | Glass 3 | Glass 4 | Glass 5 |
|---|---|---|---|---|---|
| $SiO_2$ | 68.97 | 70.00 | 63.66 | 66.92 | 66.12 |
| $Al_2O_3$ | 9.00 | 10.00 | 10.68 | 9.99 | 11.19 |
| MgO | 6.00 | 5.00 | 5.69 | 4.30 | 3.10 |
| CaO | 0.00 | 0.00 | 0.20 | 0.20 | 0.20 |
| $TiO_2$ | 0.04 | 0.00 | 0.11 | 0.11 | 0.11 |
| $ZrO_2$ | 1.00 | 1.00 | 1.00 | 1.00 | 1.30 |
| $Li_2O$ | 9.50 | 10.00 | 10.68 | 10.09 | 10.39 |
| $Na_2O$ | 4.50 | 3.00 | 5.59 | 5.49 | 5.59 |
| $K_2O$ | 1.00 | 1.00 | 1.50 | 1.20 | 1.50 |
| $Y_2O_3$ | 0.00 | 0.00 | 0.90 | 0.70 | 0.50 |
| Tg (° C.) | 550 | 586 | 553 | 555 | 558 |

The resulting molten glass was cast into a mold, kept at a temperature of [glass transition temperature+50° C.] for 1 hour, and then cooled to room temperature at a rate of 0.5° C./min, to obtain a glass block. The resulting glass block was cut and ground, and finally, the both surfaces thereof were mirror-finished to obtain a sheet-form glass having a desired shape. A thickness t [mm] of the glass is shown in Table 1. The resulting glass was subjected to the two-stages chemical strengthening treatment shown in each of Tables 2 and 3, to obtain chemically strengthened glasses of Examples 1 to 14 and Examples 20 to 24. A stress profile of the chemically strengthened glass of Example 5 is illustrated in FIG. 1. FIGS. 3 to 7 illustrate stress profiles of the chemically strengthened glasses of Examples 20 to 24, respectively.

(Stress Profile)

With respect to the chemically strengthened glass, a stress value $CS_x$ [MPa] of a portion with depth of x [μm] from the glass surface was measured or calculated. For the evaluation of $CS_x$ until the depth of 30 μM from the surface layer of the glass, a surface stress meter FSM-6000, manufactured by Orihara Industrial Co., Ltd. was used, and for the evaluation of $CS_x$ from the depth of 30 μm to the depth of 300 μm, SLP1000 which is a measuring device utilizing scattered-light photoelasticity, manufactured by Orihara Industrial Co., Ltd. was used.

Subsequently, values of $A_1$, $B_1$, $A_2$, $B_2$, C, $A_1/B_1$, and $A_2/B_2$ were determined by approximating the profile of $CS_x$ by an error least-squares method in a range of 0<x<3t/8 using the following function (I). The results are shown in Tables 2 and 3.

$$A_1 \mathrm{erfc}(x/B_1) + A_2 \mathrm{erfc}(x/B_2) + C \quad (I)$$

In the function (I), erfc is a complementary error function, and relations of $A_1 > A_2$, and $B_1 < B_2$ are satisfied.

Examples 15 to 19

Examples 15 to 19 are results described on the basis of PTL 1 (US 2015/0239775 A). These are corresponding to Sample b, Sample f, Sample g, Sample i, and Sample j, respectively in PTL 1. Values of $A_1$, $B_1$, $A_2$, $B_2$, C, $A_1/B_1$, and $A_2/B_2$ were determined by digitalizing the stress value profiles (FIGS. 5c, 9b, 10b, 11, and 12b) described in PTL 1 with an image analysis software and approximating the digitalized stress value profiles using the function (I). The results are shown in Table 3. In addition, the stress profile of the chemically strengthened glass of Example 15 is illustrated in FIG. 1.

(CS and DOL)

CS and DOL of the chemically strengthened glasses of Examples 1 to 24 are shown in Tables 2 to 3. CS and DOL were evaluated using a surface stress meter FSM-6000, manufactured by Orihara Industrial Co., Ltd. and SLP1000 which is a measuring device utilizing scattered-light photoelasticity, manufactured by Orihara Industrial Co., Ltd. The depth at which the stress value $CS_x$ is zero was defined as DOL, and $CS_x$ on the outermost surface layer was defined as CS.

(Four-Point Bending Test)

With respect to the chemically strengthened glasses obtained in Example 5, Example 9, Example 13, and Example 14, the bending strength (unit: MPa) was measured by performing the four-point bending test under a condition of a lower spun of 30 mm, an upper spun of 10 mm, and a crosshead speed of 0.5 mm/min. The results are shown in Table 2. In Table 2, a blank column means that the evaluation was not performed.

(Pendulum Impact Test)

With respect to the chemically strengthened glasses obtained in Example 5, Example 9, Example 13, and Example 14, the fracture energy was measured using a pendulum impact tester under an evaluation condition of the following condition. The results are shown in Table 2. A diamond indenter (indenter angle of the facing angle: 160°) was installed in a tip of a pendulum, and a sum of weights of the pendulum and the diamond indenter was adjusted to 300 g. The pendulum and the diamond indenter were lifted up to a certain fixed angle and then immobilized, followed by releasing, thereby controlling the tip of the diamond indenter so as to move with a certain fixed kinematic energy.

In the pendulum movement, by disposing a glass sample in the vicinity where the kinematic energy of the diamond indenter became maximum such that the diamond indenter collided perpendicular against the glass sample and repeatedly colliding the diamond indenter against the glass sample while making the kinematic energy as a variable, a fragmentation probability of the glass sample was evaluated. The kinematic energy of the diamond indenter when the fragmentation probability of the glass sample reached 50% was evaluated as the fracture energy. The results are shown in Table 2. In Table 2, a blank column means that the evaluation was not performed.

TABLE 2

|  |  | Example 1 | Example 2 | Example 3 | Example 4 | Example 5 | Example 6 | Example 7 |
|---|---|---|---|---|---|---|---|---|
| Glass composition |  |  |  |  | Glass 1 |  |  |  |
| First-stage strengthening condition | Molten salt |  |  |  | $NaNO_3$ 100% salt |  |  |  |
|  | Temperature (° C.) |  |  |  | 450 |  |  |  |
|  | Time (h) | 3 | 3 | 3 | 3 | 3 | 3 | 3 |
| Second-stage strengthening condition | Molten salt |  |  |  | $KNO_3$ 100% salt |  |  |  |
|  | Temperature (° C.) | 400 | 400 | 400 | 425 | 425 | 425 | 425 |
|  | Time (h) | 1 | 1.5 | 2 | 0.5 | 1 | 1.5 | 2 |
| Thickness t (μm) |  | 800 | 800 | 800 | 800 | 800 | 800 | 800 |
| $A_1$ (MPa) |  | 901 | 876 | 850 | 906 | 804 | 828 | 813 |

TABLE 2-continued

|  | | | | | | | |
|---|---|---|---|---|---|---|---|
| $B_1$ (μm) | 1.5 | 1.7 | 2.1 | 1.5 | 2.2 | 2.8 | 3.2 |
| $A_2$ (MPa) | 348 | 336 | 378 | 349 | 380 | 321 | 287 |
| $B_2$ (μm) | 177 | 185 | 229 | 185 | 208 | 202 | 207 |
| C (MPa) | −89 | −90 | −124 | −93 | −114 | −95 | −87 |
| $A_1/B_1$ | 608 | 524 | 405 | 585 | 367 | 293 | 252 |
| $A_2/B_2$ | 2 | 1.8 | 1.7 | 1.9 | 1.8 | 1.6 | 1.4 |
| $B_2/t$ | 0.221 | 0.232 | 0.286 | 0.231 | 0.26 | 0.252 | 0.259 |
| CS (MPa) | 1160 | 1122 | 1104 | 1162 | 1070 | 1054 | 1012 |
| DOL (μm) | 144 | 147 | 161 | 147 | 155 | 153 | 155 |
| Stress profile | | | | | Solid line in FIG. 1 | | |
| Four-point bending strength (MPa) | | | | | 778 | | |
| Pendulum test results Fracture energy (mJ) | | | | | 119 | | |

|  |  | Example 8 | Example 9 | Example 10 | Example 11 | Example 12 | Example 13 | Example 14 |
|---|---|---|---|---|---|---|---|---|
| Glass composition | | | | | Glass 1 | | | |
| First-stage strengthening condition | Molten salt | | | NaNO₃ 100% salt | | | KNO₃ 100% salt | |
| | Temperature (° C.) | | | 450 | | | 450 | |
| | Time (h) | 3 | 3 | 3 | 2.3 | 2.3 | 6 | 6 |
| Second-stage strengthening condition | Molten salt | | | KNO₃ 100% salt | | | NaNO₃ 100% salt | |
| | Temperature (° C.) | 450 | 450 | 450 | 450 | 450 | 425 | 450 |
| | Time (h) | 0.5 | 1 | 1.5 | 1 | 0.5 | 4 | 6 |
| Thickness t (μm) | | 800 | 800 | 800 | 500 | 650 | 800 | 800 |
| $A_1$ (MPa) | | 783 | 741 | 735 | 685 | 789 | 446 | 446 |
| $B_1$ (μm) | | 2.3 | 3.3 | 4.2 | 4.0 | 2.5 | 10.4 | 10.4 |
| $A_2$ (MPa) | | 349 | 363 | 273 | 271 | 300 | 231 | 203 |
| $B_2$ (μm) | | 196 | 246 | 226 | 111 | 157 | 125 | 151 |
| C (MPa) | | −99 | −128 | −91 | −96 | −116 | −47 | −50 |
| $A_1/B_1$ | | 337 | 221 | 173 | 171 | 309 | 43 | 43 |
| $A_2/B_2$ | | 1.8 | 1.5 | 1.2 | 2.5 | 1.9 | 1.8 | 1.3 |
| $B_2/t$ | | 0.245 | 0.307 | 0.283 | 0.221 | 0.242 | 0.156 | 0.189 |
| CS (MPa) | | 1033 | 975 | 916 | 956 | 1089 | 629 | 610 |
| DOL (μm) | | 151 | 165 | 160 | 90 | 122 | 120 | 133 |
| Stress profile | | | | | | | | |
| Four-point bending strength (MPa) | | | 835 | | | | 378 | 356 |
| Pendulum test results Fracture energy (mJ) | | | 128 | | | | 64.0 | 64.0 |

TABLE 3

|  |  | Example 15 | Example 16 | Example 17 | Example 18 | Example 19 |
|---|---|---|---|---|---|---|
| Glass composition | | | | PTL 1 | | |
| First-stage strengthening condition | Molten salt | Na52K48 salt | Na45K55 salt | Na37K63 salt | Na38K62 salt | Na37K63 salt |
| | Temperature (° C.) | 441 | 450 | 440 | 450 | 440 |
| | Time (h) | 10 | 8.5 | 8.8 | 7.5 | 11 |
| Second-stage strengthening condition | Molten salt | Na1K99 salt | Na1K99 salt | Na1K99 salt | Na2K98 salt | Na1K99 salt |
| | Temperature (° C.) | 390 | 390 | 390 | 390 | 390 |
| | Time (h) | 0.2 | 0.2 | 0.2 | 0.3 | 0.2 |
| Thickness t (μm) | | 400 | 700 | 800 | 900 | 1000 |
| $A_1$ (MPa) | | 563 | 599 | 566 | 567 | 561 |
| $B_3$ (μm) | | 6.5 | 6.6 | 6.6 | 6.8 | 6.9 |
| $A_2$ (MPa) | | 432 | 359 | 438 | 451 | 447 |
| $B_2$ (μm) | | 72 | 80 | 76 | 89 | 89 |
| C (MPa) | | −70.6 | −66.4 | −82.2 | −92.9 | −90.1 |
| $A_1/B_1$ | | 87 | 90 | 85 | 83 | 81 |
| $A_2/B_2$ | | 6 | 4.5 | 5.7 | 5.1 | 5 |
| $B_2/t$ | | 0.181 | 0.115 | 0.096 | 0.099 | 0.089 |
| CS (MPa) | | 862 | 843 | 858 | 856 | 854 |
| DOL (μm) | | 71 | 73 | 71 | 71 | 80 |
| Stress profile | | Dotted line in FIG. 1 | | | | |

|  |  | Example 20 | Example 21 | Example 22 | Example 23 | Example 24 |
|---|---|---|---|---|---|---|
| Glass composition | | Glass 2 | Glass 3 | | Glass 4 | Glass 5 |
| First-stage strengthening condition | Molten salt | Na100 | Na10K90 | Na100 | Na100 | Na10K90 |
| | Temperature (° C.) | 450 | 450 | 450 | 450 | 450 |
| | Time (h) | 2 | 3 | 1 | 1 | 2 |
| Second-stage strengthening condition | Molten salt | | | KNO₃ 100% salt | | |
| | Temperature (° C.) | 425 | 380 | 415 | 400 | 380 |
| | Time (h) | 1 | 0.5 | 1 | 1 | 0.5 |
| Thickness t (μm) | | 600 | 600 | 600 | 600 | 600 |
| $A_1$ (MPa) | | 778 | 945 | 992 | 1026 | 725 |
| $B_3$ (μm) | | 3.0 | 3.5 | 1.3 | 1.7 | 3.8 |
| $A_2$ (MPa) | | 385 | 344 | 347 | 326 | 404 |
| $B_2$ (μm) | | 134 | 125 | 126 | 134 | 117 |

TABLE 3-continued

Figure 3:
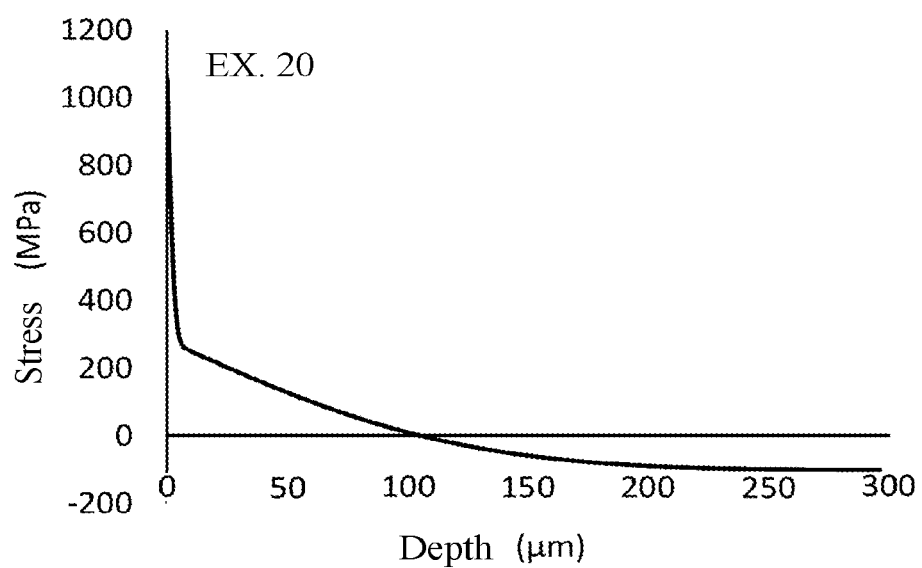
FIG. 3 illustrates an example of a stress distribution pattern of a chemically strengthened glass of a working example (Example 20).
Figure 4:
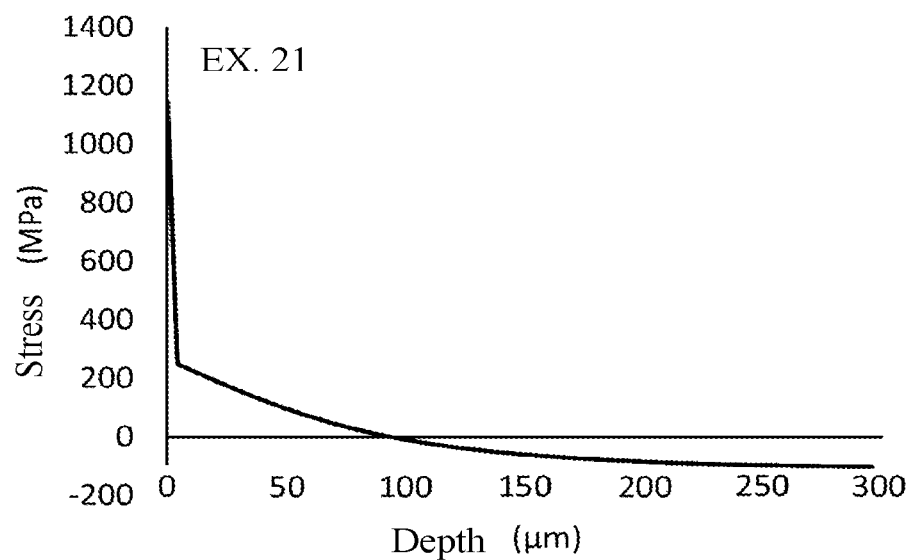
FIG. 4 illustrates an example of a stress distribution pattern of a chemically strengthened glass of a working example (Example 21).
Figure 5:
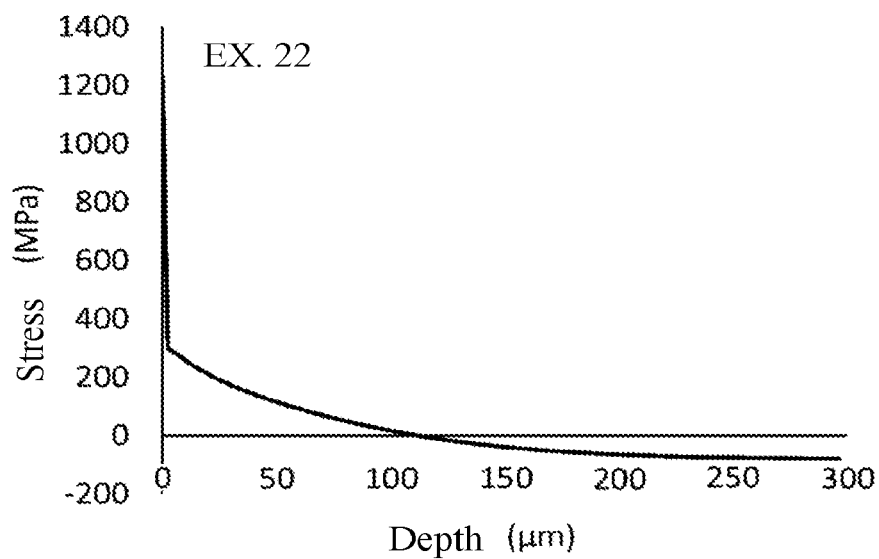
FIG. 5 illustrates an example of a stress distribution pattern of a chemically strengthened glass of a working example (Example 22).
Figure 6:
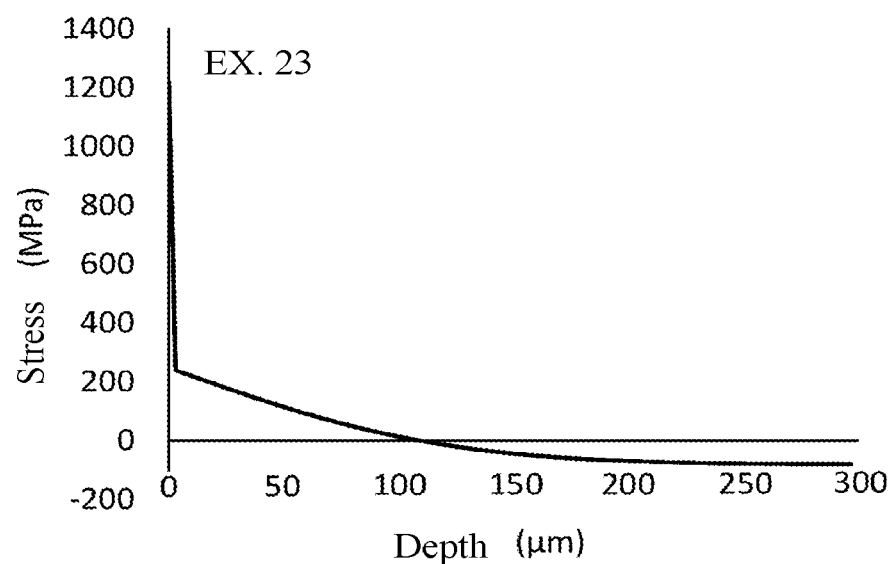
FIG. 6 illustrates an example of a stress distribution pattern of a chemically strengthened glass of a working example (Example 23).
Figure 7:
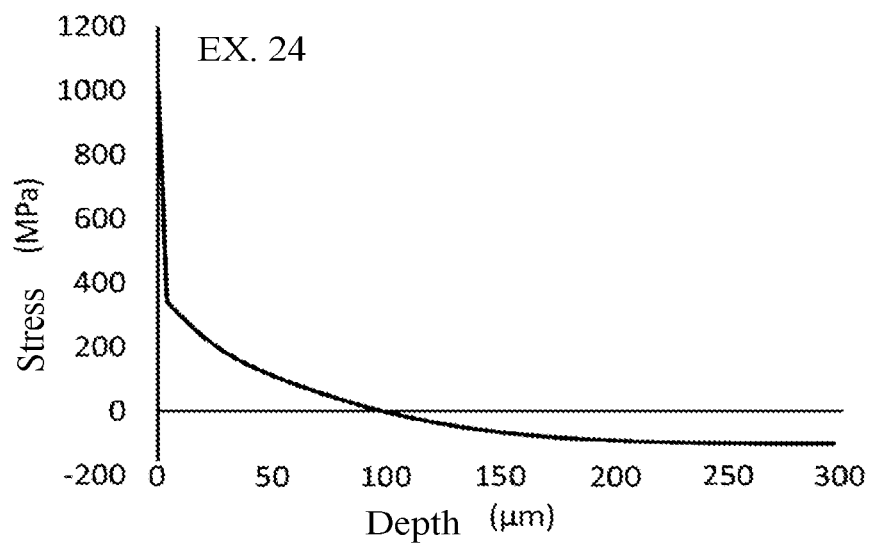
FIG. 7 illustrates an example of a stress distribution pattern of a chemically strengthened glass of a working example (Example 24).

| | | | | | |
|---|---|---|---|---|---|
| C (MPa) | −102 | −87 | −86 | −87 | −94 |
| $A_1/B_1$ | 258 | 272 | 793 | 588 | 190 |
| $A_2/B_2$ | 2.9 | 2.8 | 2.8 | 2.4 | 3.5 |
| $B_2/t$ | 0.224 | 0.208 | 0.210 | 0.223 | 0.195 |
| CS (MPa) | | | | | |
| DOL (μm) | | | | | |
| Stress profile | FIG. 3 | FIG. 4 | FIG. 5 | FIG. 6 | FIG. 7 |

As shown in Tables 2 and 3, it was noted that the chemically strengthened glasses of Examples 1 to 12 and 20 to 24 that are concerned with working examples have both a high surface compressive stress and a large depth of a compressive stress layer as compared with the chemically strengthened glasses of Examples 13 to 19 that are concerned with comparative examples.

In addition, as illustrated in FIG. 1, it is noted that the chemically strengthened glass of Example 5 that is concerned with a working example has such a stress profile that the depth of a compressive stress layer of the stress distribution pattern 1 on the glass surface side is small and that the compressive stress value of the stress distribution pattern 2 on the glass internal side is small, and has both a high surface compressive stress and a large depth of a compressive stress layer as compared with the chemically strengthened glass of Example 15 that is concerned with a comparative example, while controlling the total amount of the compressive stress values to a certain value or less.

Furthermore, as shown in Table 1, it is noted that as compared with Example 13 and Example 14 each having a small surface compressive stress and small depth of a compressive stress layer, Example 5 and Example 9 each having large surface compressive stress and large depth of a compressive stress layer are large with respect to the four-point bending strength and the fracture energy in the pendulum impact test.

These results demonstrate that the chemically strengthened glass of the present invention has a high strength as a chemically strengthened glass as compared with that of the conventional art.

While the present invention has been described in detail and with reference to specific embodiments thereof, it will be apparent to one skilled in the art that various changes and modifications can be made therein without departing from the spirit and scope thereof. The present application is based on a Japanese patent application filed on Apr. 6, 2017 (Japanese Patent Application No. 2017-076106) and a Japanese patent application filed on Feb. 5, 2018 (Japanese Patent Application No. 2018-018508), the entireties of which are incorporated by reference. In addition, all the references cited herein are incorporated as a whole.

The invention claimed is:

1. A chemically strengthened glass satisfying $A_1$ [MPa] of 600 or more, $A_2$ [MPa] of 50 or more, $B_1$ [μm] of 6 or less, $B_2$ [μM] of 10% or more of t [μm], C [MPa] of −30 or less, $A_1/B_1$ [MPa/μm] of 100 or more, and $A_2/B_2$ [MPa/μm] of 1.9 or less when the chemically strengthened glass has a thickness t [μm] and a profile of a stress value [MPa] at a depth x [μm] from a glass surface is approximated by an error least-squares method in a region of 0<x<3t/8 using the following function (I) while defining a compressive stress as positive and a tensile stress as negative:

$$A_1 \mathrm{erfc}(x/B_1) + A_2 \mathrm{erfc}(x/B_2) + C \quad (I),$$

wherein erfc is a complementary error function, and relations of $A_1 > A_2$ and $B_1 < B_2$ are satisfied, the chemically strengthened glass having a base composition comprising 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, and 0 to 20% of $K_2O$ in mole percentage on an oxide basis.

2. The chemically strengthened glass according to claim 1, wherein $B_2$ [μm] is 20% or more of t [μm].

3. The chemically strengthened glass according to claim 1, wherein $A_2$ [MPa] is 150 or more.

4. The chemically strengthened glass according to claim 1, wherein C [MPa] is −70 or less.

5. The chemically strengthened glass according to claim 1, wherein the thickness t is 0.3 mm or more and 2 mm or less.

6. The chemically strengthened glass according to claim 1, having a base composition comprising 50 to 80% of $SiO_2$, 4 to 30% of $Al_2O_3$, 0 to 15% of $B_2O_3$, 0 to 15% of $P_2O_5$, 0 to 20% of MgO, 0 to 20% of CaO, 0 to 10% of SrO, 0 to 10% of BaO, 0 to 10% of ZnO, 0 to 10% of $TiO_2$, 0 to 10% of $ZrO_2$, 3 to 20% of $Li_2O$, 0 to 20% of $Na_2O$, 0 to 20% of $K_2O$, and 0.1 to 5% of $Y_2O_3$ in mole percentage on an oxide basis.

7. The chemically strengthened glass according to claim 1, which is a glass substrate for a cover glass.

8. The chemically strengthened glass according to claim 1, wherein $A_2/B_2$[MPa/μm] is 1.8 or less.

9. The chemically stregthened glass according to claim 1, wherein $A_1/B_1$[MPa/μm]is 180 or more.

* * * * *